United States Patent
Pettersson

(10) Patent No.: US 6,615,057 B1
(45) Date of Patent: Sep. 2, 2003

(54) METHOD AND ARRANGEMENT FOR COMMUNICATING SUBSCRIBER RELATED DATA IN A WIRELESS COMMUNICATIONS SYSTEM

(75) Inventor: Mats Pettersson, Lund (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 09/305,503

(22) Filed: May 5, 1999

(30) Foreign Application Priority Data

May 8, 1998 (SE) .............................................. 9801612

(51) Int. Cl.[7] .................................................. H04B 1/38
(52) U.S. Cl. ....................... 455/558; 455/419; 455/420; 455/466
(58) Field of Search ................................. 455/558, 419, 455/420, 422, 466, 66, 41, 88, 11.1

(56) References Cited

U.S. PATENT DOCUMENTS

| | | | | | |
|---|---|---|---|---|---|
| 4,803,487 | A | * | 2/1989 | Willard et al. ............. | 340/7.54 |
| 5,768,683 | A | * | 6/1998 | Mulford ..................... | 455/11.1 |
| 5,915,225 | A | * | 6/1999 | Mills .......................... | 455/558 |
| 5,987,325 | A | * | 11/1999 | Tayloe ........................ | 455/435 |
| 6,055,442 | A | * | 4/2000 | Dietrich ...................... | 455/558 |
| 6,263,218 | B1 | * | 7/2001 | Kita ........................... | 455/567 |
| 6,459,882 | B1 | * | 10/2002 | Palermo et al. ............. | 455/11.1 |

FOREIGN PATENT DOCUMENTS

| | | | |
|---|---|---|---|
| EP | 0 555 992 | | 8/1993 |
| EP | 0 562 890 A1 | | 9/1993 |
| EP | 0 669 774 A1 | | 8/1995 |
| EP | 0 771 090 A2 | | 5/1996 |
| FI | WO 09625828 A1 | * | 8/1996 ............ H04Q/7/32 |
| FR | 2 739 952 | | 4/1997 |
| GB | 2303023 | | 2/1997 |
| GB | 2 304 247 | | 3/1997 |
| SE | WO 09858510 A1 | * | 12/1998 ............ H04Q/7/32 |
| WO | WO 92/19078 | | 10/1992 |
| WO | WO 94/08433 | | 4/1994 |
| WO | WO 96/11545 | | 4/1996 |
| WO | WO 96/21327 | | 7/1996 |
| WO | WO 98/58510 | | 12/1998 |

OTHER PUBLICATIONS

PCT International Search Report, Apr. 6, 1999; 9801612–4.

* cited by examiner

Primary Examiner—Edward F. Urban
Assistant Examiner—Lana Le
(74) Attorney, Agent, or Firm—Jenkens & Gilchrist, P.C.

(57) ABSTRACT

The present invention relates to an arrangement for communication of subscriber identity module related data in a wireless communication system. The arrangement comprises a wireless communication terminal with a subscriber identity unit which includes a subscriber identity module, to which a subscriber identity is assigned. The present invention also relates to a method for communication of subscriber identity module related data in a wireless communication system for implementation in a wireless communication terminal having a subscriber identity unit. The subscriber identity unit is arranged to communicate the subscriber identity module related data, such as, for example the subscriber identity, to the terminal over a local wireless communication link. The arrangement according to the present invention makes it possible to separate the subscriber identity unit from the terminal while the terminal is communicating using the wireless system.

37 Claims, 10 Drawing Sheets

METHOD AND ARRANGEMENT FOR COMMUNICATING SUBSCRIBER RELATED DATA IN A WIRELESS COMMUNICATIONS SYSTEM

TECHNICAL FIELD OF THE INVENTION

The present invention relates to an arrangement for communication of subscriber identity module related data in a wireless communication system. The arrangement comprises at least one wireless communication terminal with a subscriber identity unit which is adapted to comprise a subscriber identity module to which a subscriber identity is assigned. The present invention also relates to a station comprising a subscriber identity unit. The present invention also relates to a method for communication of subscriber identity module related data in a wireless communication system for implementation in a wireless communication terminal with a subscriber identity unit.

DESCRIPTION OF RELATED ART

A subscriber identity is assigned to a terminal in a wireless communication system which uses a subscriber identity media. The wireless communication system determines, via a subscriber identity module (SIM) attached to the terminal, whether or not a subscriber requesting a communication service is a subscriber qualified to receive communication services which the system provides.

The term 'terminal', which also is referred to as a wireless communication terminal, includes all portable radio communication equipment to which a subscriber identity is assigned such as a mobile telephone, a communicator, i.e. a so called electronic organiser, or the like. The wireless communication system can for instance be any cellular mobile phone system such as GSM (Global System for Mobile Communications) or any satellite telecommunication system.

The SIM will now be described as implemented in a GSM network wherein the SIM is implemented as a card having a ROM (Read Only Memory), a RAM (Read Access Memory), an EEPROM (Electrically Erasable Programmable Read Only Memory), a processor unit and an interface to the terminal. The memory of the SIM provides storage of the subscriber identity which is the International Mobile Subscriber Identity (IMSI) in a GSM network. The terminal can only be operated if a valid SIM is present except for emergency calls, when operation is allowed anyway. The SIM supports a security function for verification of the user of the terminal and for authentication of the user to the GSM network; the SIM is able to handle a personal identification number (PIN) which consists of 4 to 8 digits. If an incorrect PIN is entered to the terminal, an indication is given to the user of the terminal. After three consecutive incorrect entries the SIM is blocked. Blocking of a SIM puts it into a status which forbids GSM network operations. The SIM also contains information elements for GSM network operations. These elements can be related to the mobile subscriber, GSM services and information related to the public land mobile network (PLMN).

In a wireless communication system as described above it is convenient if the wireless communication system allows more than one terminal to share the same subscriber identity without having to pay for more than one subscription.

EP 711,090 describes a radio communication system wherein a plurality of subscriber identity modules implemented as cards and to be mounted to mobile stations share a single international subscriber identity. Consequently, a radio communication system capable of using a plurality of subscriber identity media sharing a single subscriber identity information is provided. This allows two or more different mobile stations to use the same international mobile subscriber identity without that the user have to pay for more than one subscription.

WO 94/08433 also describes a radio communication system which allows more than one mobile station to use the same international mobile subscriber identity without that the user have to pay for more than one subscription.

Though the above mentioned related art describe wireless communication systems which allow more than one terminal to share the same subscriber identity without having to pay for more than one subscription, there is a main disadvantage with the subscriber identity modules described in the above mentioned related art. The subscriber identity module may also be a carrier of other features than those previously described, such as being a card for economical transactions. Hence, the subscriber identity module may also be for instance a credit card and/or a cash card. If so, it is a disadvantage to have the subscriber identity module attached to the terminal. There is a further disadvantage with the subscriber identity modules described in the above mentioned related art. Information, such as mails and information in the address book and the calendar of a mobile station, saved on different subscriber identity modules attached to different mobile stations has to be synchronized in order not to diverge.

SUMMARY OF THE INVENTION

The general problem dealt with by the present invention is to provide an arrangement and a method for communication of subscriber identity module related data for a wireless communication terminal in a wireless communication system.

A more specific problem dealt with by the present invention is to provide an arrangement and a method for communication of subscriber identity module related data for at least two wireless communication terminals which share a common subscriber identity, wherein the subscriber identity is assigned to one of the wireless communication terminals at a time.

A further more specific problem dealt with by the present invention is to provide an arrangement and a method for communication of subscriber identity module related data for at least two wireless communication terminals to which the same subscriber identity is assigned simultaneously.

A further more specific problem dealt with by the present invention is to provide an arrangement and a method for communication of subscriber identity module related data for a wireless communication terminal in a wireless communication system wherein the subscriber identity module is separated from the wireless communication terminal while the wireless communication terminal is communicating in the wireless system.

The problem is solved essentially by an arrangement for communication of subscriber identity module related data in a wireless communication system. The arrangement comprises a wireless communication terminal and a subscriber identity unit. The subscriber identity unit, which includes a subscriber identity module to which a subscriber identity is assigned, is arranged to communicate the subscriber identity module related data with the terminal over a local wireless communication link.

The arrangement according to the present invention makes it possible to separate the subscriber identity unit from the terminal while the terminal is communicating in the wireless system.

More specifically, the present invention also relates to a station comprising a subscriber identity unit.

More precisely, the present invention also relates to a method for implementation in a wireless communication terminal with a subscriber identity unit in a wireless communication system.

A general object of the present invention is to provide an arrangement and a method for communication of subscriber identity module related data for a wireless communication terminal in a wireless communication system.

It is another object of the present invention to provide an arrangement and a method for communication of subscriber identity module related data for at least two wireless communication terminals which share a common subscriber identity, wherein the subscriber identity is assigned to one of the wireless communication terminals at a time.

It is a further object of the present invention to provide an arrangement and a method for communication of subscriber identity module related data for at least two wireless communication terminals to which the same subscriber identity is assigned simultaneously.

It is a further object of the present invention to provide an arrangement and a method for communication of subscriber identity module related data which allow separating the subscriber identity unit from the terminal while the terminal is communicating in the wireless system.

A general advantage afforded by the present invention is that an arrangement and a method for communication of subscriber identity module related data for a wireless communication terminal in a wireless communication system are provided.

A more specific advantage afforded by the present invention is that an arrangement and a method for communication of subscriber identity module related data for at least two wireless communication terminals which share a common subscriber identity, wherein the subscriber identity is assigned to one of the wireless communication terminals at a time, are provided.

A further more specific advantage of the present invention is that an arrangement and a method for communication of subscriber identity module related data for at least two wireless communication terminals to which the same subscriber identity is assigned simultaneously, are provided.

A further more specific advantage afforded by the present invention is that an arrangement and a method are provided which allow two or more users of wireless communication terminals to use the same subscriber identity without having to pay for more than one subscription. Also, it is convenient that the same phone number can be used by more than one wireless communication terminal.

A further more specific advantage afforded by the present invention is that an arrangement and a method for communication of subscriber identity module related data for a wireless communication terminal in a wireless communication system wherein the subscriber identity module is separated from the wireless communication terminal while the wireless communication terminal is communicating in the wireless system are provided.

A further more specific advantage afforded by the present invention is that a user of a wireless communication terminal does not have to insert the subscriber identity module into the terminal.

A further more specific advantage afforded by the present invention is that a user of a wireless communication terminal can more easily alter which subscriber identity that shall be assigned to the terminal.

A further more specific advantage afforded by the present invention is that information saved on the subscriber identity module, such as mails and information in the address book and the calendar of a terminal, can be used by two or more users of wireless communication terminals.

The invention will now be described more in detail below with reference to the appended drawings which illustrate various aspects of the invention by means of embodiments. The invention is not limited to these embodiments.

DETAILED DESCRIPTION OF EMBODIMENTS

Figure 1:
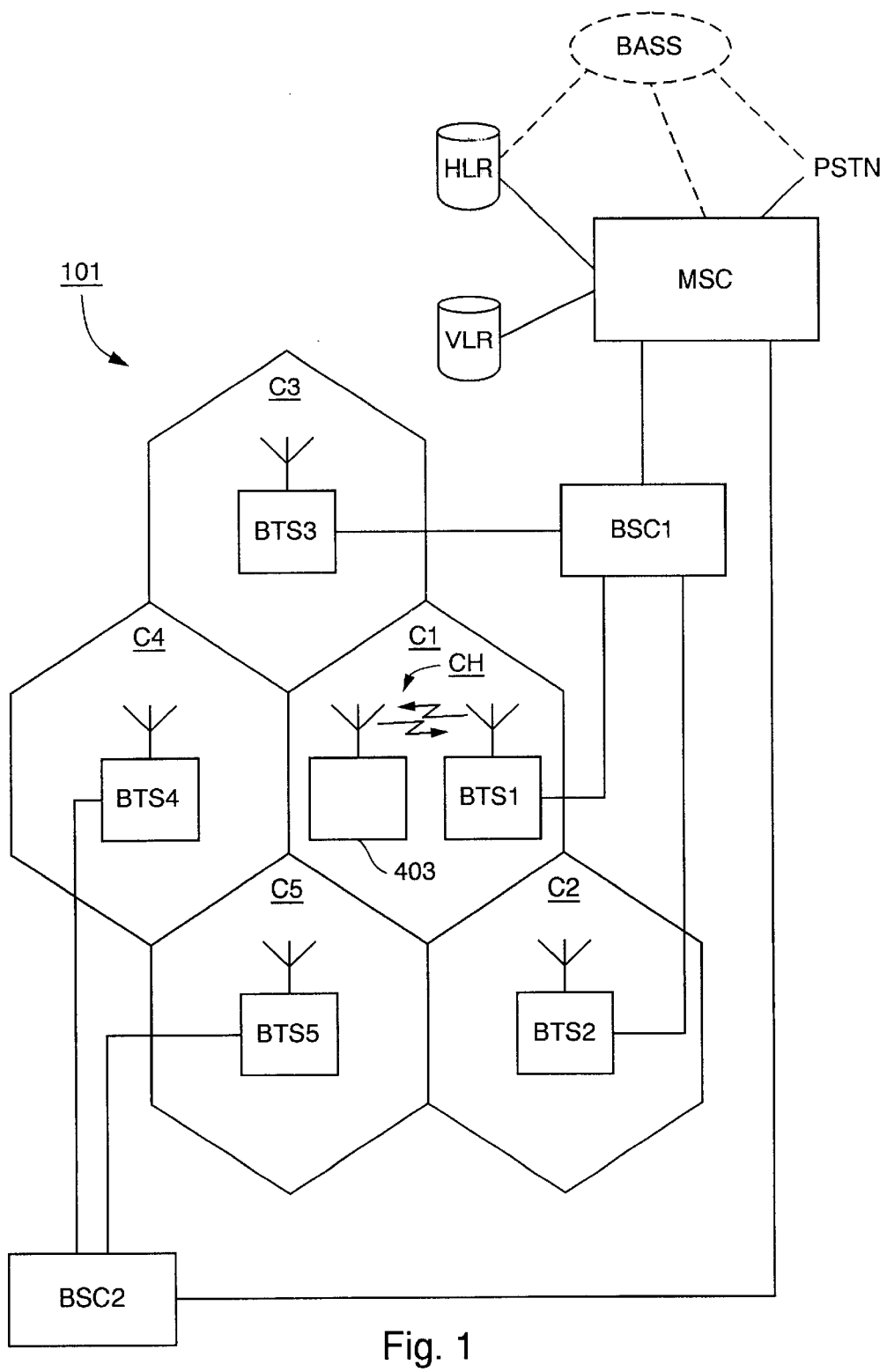
FIG. 1 is a general schematic view of a wireless communication system in which a wireless terminal is located.

FIG. 1 is a general schematic view of a part of a wireless communication system 101 which is a GSM network. The geographical area covered by the wireless communication system 101 is divided into cells C1–C5. Each cell C1–C5 provides radio coverage in a certain area and is allocated a certain set of frequencies for communication in that area.

Each cell C1–C5 is served by one base station BTS1–BTS5, called base transceiver station (BTS) in GSM terminology. The base transceiver stations are provided with means for transmitting to and receiving from a wireless communication terminal 403. The terminal 403 is currently located in the cell C1 in FIG. 1. The cell C1 in which the terminal 403 is currently located is called the serving cell and the base transceiver station BTS1 serving that cell is called the serving base transceiver station.

The terminal 403 comprises means for communication with the base transceiver stations BTS1–BTS5 in the wireless communication system 101 and is used by a subscriber to get access to the communication services provided by the wireless communication system 101. Each group of base transceiver stations is controlled by a base station controller BSC1–BSC2. A number of base station controllers BSC1–BSC2 are controlled by a mobile services switching centre MSC. The mobile service switching centre MSC is responsible for switching calls to and from mobile stations located in the area served by the mobile services switching centre MSC.

When a call is being established to or from the terminal 403, a communication channel CH dedicated for communication between the terminal 403 and the serving base transceiver station BTS1 is allocated for the call.

The switching centre MSC is adapted to control the traffic within a GSM network, and also between this network and other networks connected thereto, such as a public telephone network PSTN (Public Switched Telephone Network) or a GSM network of another operator (not shown in FIG. 1).

Two different registers are also connected to the switching centre MSC, namely a home location register HLR containing information on the system's own subscribers, and a visitor location register VLR containing information on active, and consequently registered, visitors found in the coverage area of the GSM network. A visitor is either a home subscriber or a subscriber associated with another GSM operator. The information in the visitor location register VLR is always retrieved from the subscriber's home location register HLR and includes a subscriber identity 902 (see FIG. 9) making it possible to positively identify and address a visitor. In a GSM network the subscriber identity is called the International Mobile Subscriber Identity (IMSI). If a registered visitor ceases to be active in the network associated with the visitor location register VLR, the information of him found in the visitor location register can be erased, in order to be retrieved from the home location register HLR if he becomes active again.

A billing administration support system BASS might be connected to the switching centre MSC, to the home location register HLR and to the visitor location register VLR. The billing administration support system BASS is an operator service that supports billing administration if a subscriber identity module 201 (see FIG. 2) of the terminal 403 is used as a credit card or a cash card.

The wireless communication system 101 according to the present invention is not limited to a GSM network. It can for instance be any cellular mobile phone system such as a PCS network, any satellite telecommunication system or any other wireless communication system where the subscriber identity 902 is assigned to each wireless communication terminal which is active in the system. The access method used in a GSM network is time division multiple access (TDMA). However, in a wireless communication system according to the present invention any other access method is applicable such as frequency division multiple access (FDMA) or code division multiple access (CDMA).

Figure 2:
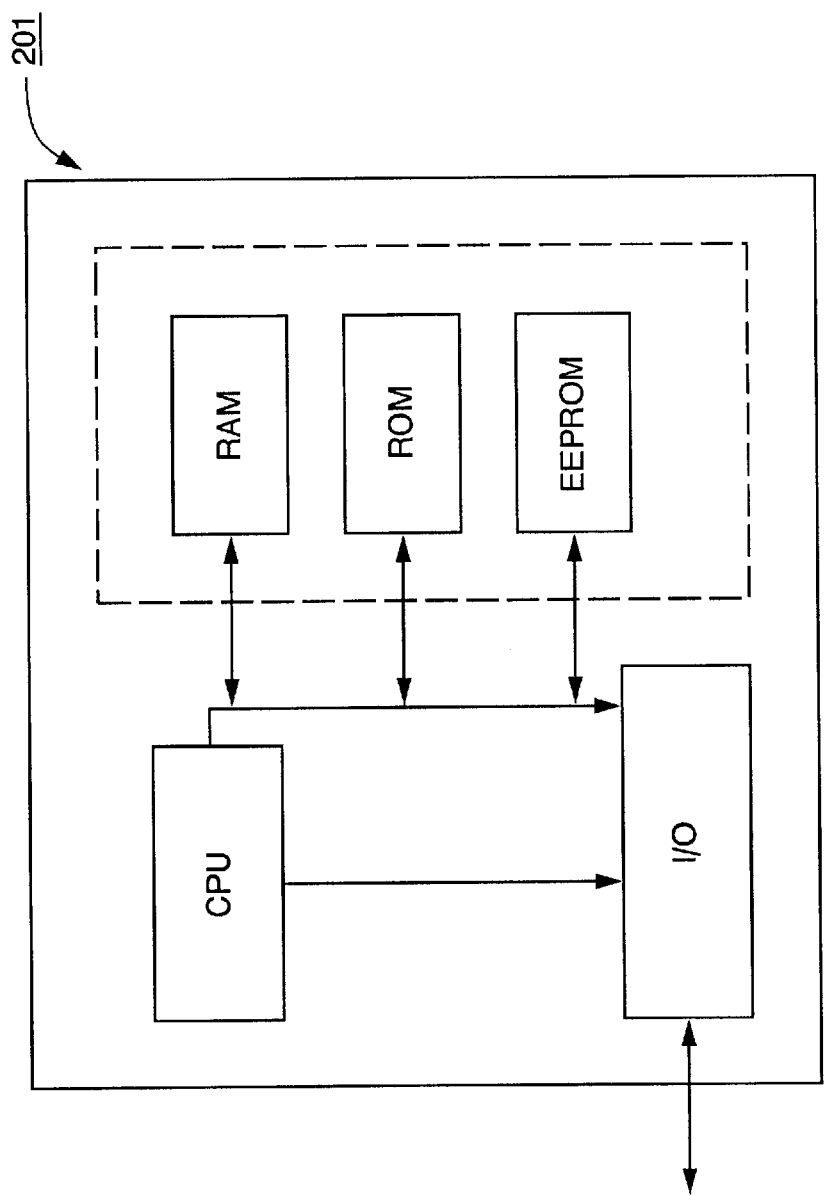
FIG. 2 illustrates in a block scheme a subscriber identity module.

FIG. 2 illustrates in a block scheme a subscriber identity module 201.

The previously known subscriber identity module 201 in FIG. 2 is described as implemented in a GSM network wherein the subscriber identity module 201 is implemented as a card having a read only memory ROM, a read access memory RAM, an electrically erasable programmable read only memory EEPROM, a processor unit CPU and an interface to the terminal I/O. The memory of the subscriber identity module 201 provides storage of the subscriber identity 902 (see FIG. 9) which is the International Mobile Subscriber Identity IMSI in a GSM network. The terminal 403 can only be operated if a valid subscriber identity module 201 is present except for emergency calls, when operation is allowed anyway. The subscriber identity module 201 supports a security function for verification of the user of the wireless terminal 403 and for authentication of the user to the network. The subscriber identity module 201 is able to handle a personal identification number PIN which consists of 4 to 8 digits. If an incorrect PIN is entered to the terminal 403, an indication is given to the user of the terminal 403. After three consecutive incorrect entries the subscriber identity module 201 is blocked. Blocking of a subscriber identity module 201 puts it into a status which forbids GSM network operations.

Figure 3:
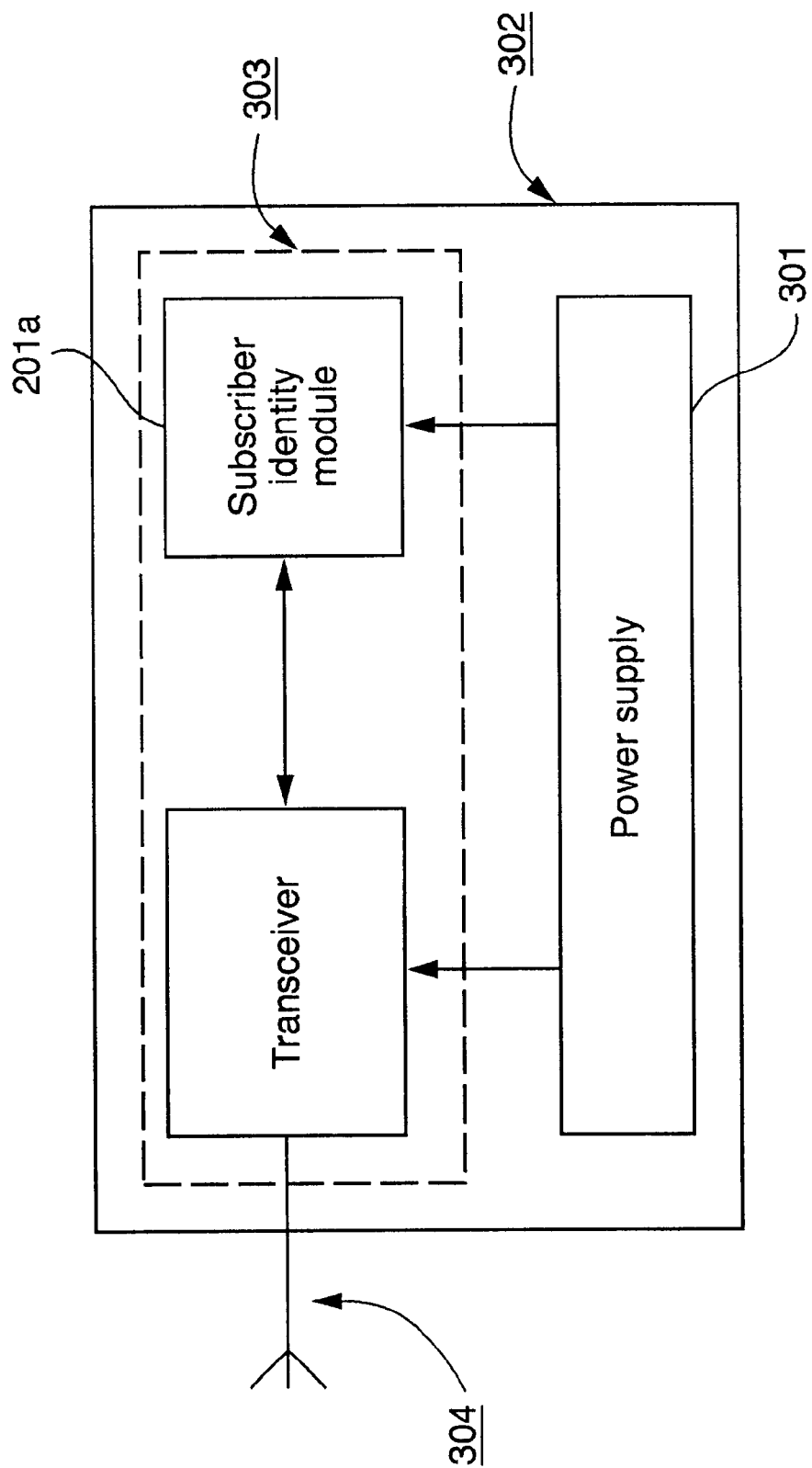
FIG. 3 illustrates in a block scheme an embodiment of the present invention with a subscriber identity terminal including a subscriber identity unit.

FIG. 3 illustrates in a block scheme an embodiment of the present invention with a subscriber identity terminal 302 including a subscriber identity unit 303 and a power supply 301. Both the subscriber identity terminal 302 and the subscriber identity unit 303 respectively are hereinafter also referred to as a station. The station is a device which comprises at least the subscriber identity unit and can hence be the subscriber identity unit itself.

The subscriber identity unit 303 comprises a subscriber identity module 201a and a first communication means 304. The first communication means 304 is a transceiver for communicating different types of data (see FIG. 9) with a second communication means 401 of the wireless communication terminal 403 (see FIG. 4).

The power supply 301 provides the subscriber identity module 201a and the transceiver with power.

Figure 4:
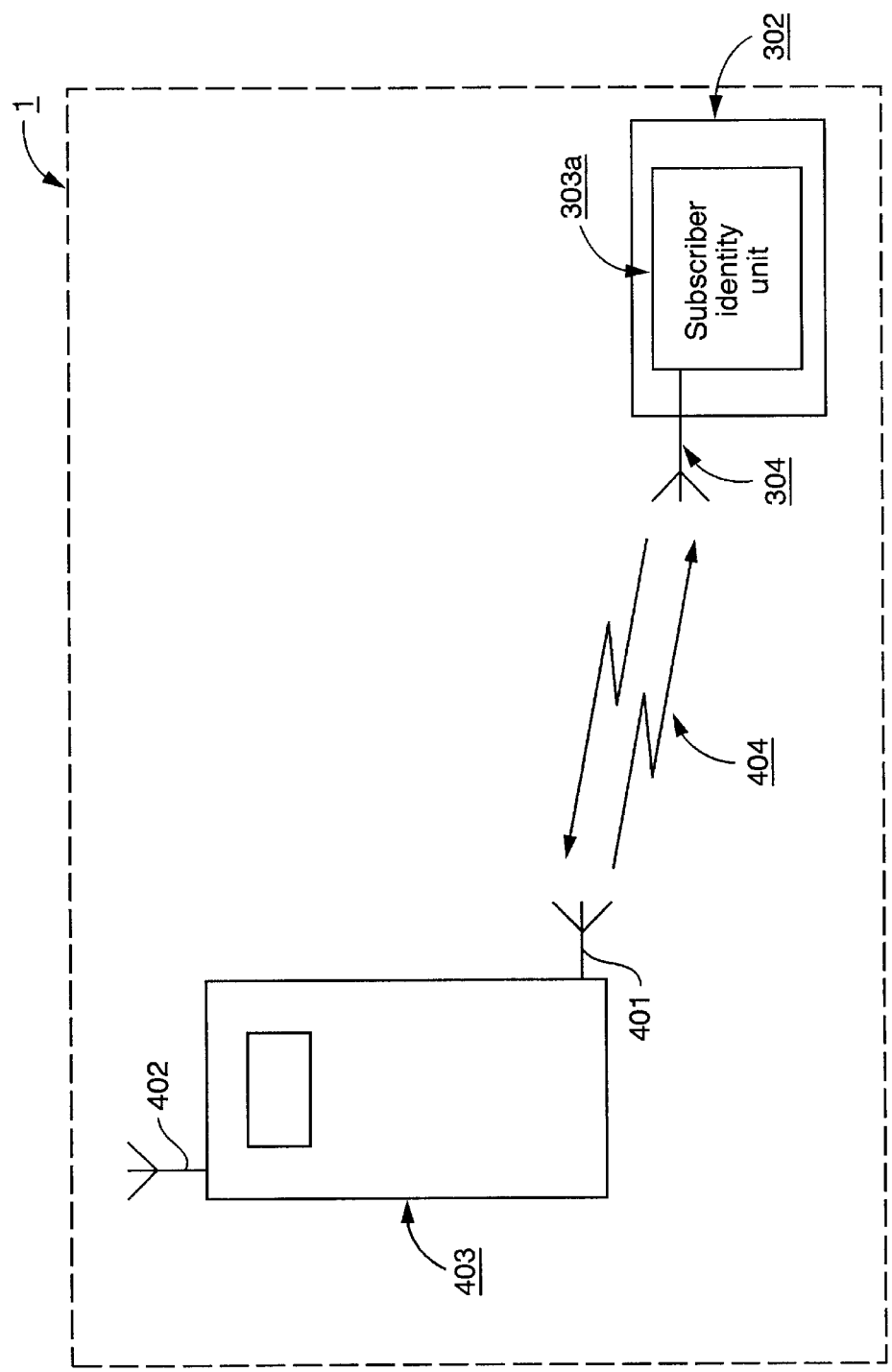
FIG. 4 illustrates in a block scheme an embodiment of an inventive arrangement with a wireless communication terminal and a subscriber identity terminal.

FIG. 4 illustrates in a block scheme an embodiment of an inventive arrangement 1 with the wireless communication terminal 403 and the subscriber identity terminal 302 including a subscriber identity unit 303a according to the present invention. The wireless communication terminal 403 and the subscriber identity terminal 302 are separated from each other. By separated is hereinafter meant at least electrically separated, but in a preferred embodiment of the present invention is meant both electrically and physically separated.

The subscriber identity terminal 302 and the subscriber identity unit 303a respectively are also referred to as a station. As mentioned previously, the station is a device which comprises at least the subscriber identity unit.

The wireless communication terminal 403 can for instance be a portable radio communication equipment such as a mobile station i.e. a mobile phone, a pager, a communicator, i.e. a so called electronic organizer, or the like. The wireless communication terminal can as well be a non portable radio communication equipment such as a telefax, a personal computer or an electronic organizer. The wireless communication terminal 403 can for instance be used for transmission and reception of voice, data or video.

The wireless terminal 403 comprises a second communication means 401. By means of the second communication means 401 which is a transceiver, the wireless terminal communicates different types of data (see FIG. 9) over a local wireless communication link 404 with the first communication means 304 of the subscriber identity unit 303a comprised in the subscriber identity terminal 302. The local wireless communication link 404; 404a; 404b; 404c; 404d is defined as a local link between the first communication means 304 of the subscriber identity unit 303; 303a; 303b; 303c; and a transmitter and/or receiver locally positioned nearby the subscriber identity unit. In FIG. 4 and in a preferred embodiment of the present invention, the transmitter and/or receiver locally positioned nearby the subscriber identity unit is the second communication means 401 comprised in the wireless communication terminal 403. However, in another embodiment of the present invention a transceiver not comprised in the wireless communication terminal 403 is locally positioned nearby the subscriber identity unit (this embodiment is not shown in any Figure). In this embodiment the transceiver locally positioned nearby the wireless communication terminal 403 is transmitting, i.e. repeating, the signal received via the local wireless communication link to the second communication means 401 of the wireless terminal 403.

In FIG. 4, the wireless terminal 403 comprises the second communication means 401 and a transceiver 402. The terminal 403 communicates via the transceiver 402 with the wireless communication system 101 (see FIG. 1). However, in another embodiment of the present invention the transceiver 402 for communication with the wireless communication system 101 is incorporated in the second communication means 401 of the terminal 403.

The local wireless communication link 404 can for instance be within a radio frequency range. In an embodiment of the present invention the local wireless communication link 404 is within the frequency range of approximately 2.4 GHz. The local wireless communication link 404 can also be within an infrared frequency range. However, the local wireless communication link can be any wireless link such as an electromagnetic link, a magnetic link or an inductive link. Examples of electromagnetic links are links within the mircowave frequency range, the radio frequency range or the optic frequency range.

However, there is not much radio spectrum available for these kind of (private) applications. For instance, in the United States, the ISM (Industrial, Scientific, Medical) bands at 900 MHz, 2.4 GHz, and 5.7 GHz are unlicensed, and can be used freely, provided the transmission power levels are low or spreading is applied. The 2.4 GHz band is even available globally. In order to avoid interference, spreading should be applied, either by frequency-hopping or direct-sequence spread spectrum.

Assume that the embodiment of the present invention wherein the 2.4 GHz ISM band, which reaches from 2400 MHz to 2483,5 MHz, is used for the wireless local communication link 404. In order to avoid sharp filters to fulfil out-of-band emission requirements, the applied radio band is preferably placed away from the ISM band edges. Known interference areas, like the section from 2435 MHz to 2465 MHz where micro-wave ovens are operating, are preferably avoided as well. FSK (Fast Shift Keying) can be used to map a user code on the radio frequency carrier. In the FSK modulation scheme, a bit representing 'zero' is mapped to the frequency $f_{RF}+\Delta f$ and a bit representing 'one' is mapped to the frequency $f_{RF}-\Delta f$ (the opposite is also possible) where $f_{RF}$ is the carrier frequency. The frequency deviation $\Delta f$ should be large enough to combat the frequency offset between transmitter and receiver. For example, if sloppy frequency references with an accuracy of ±PPM (part per million) are used, the worst-case frequency offset can reach up to 240 kHz. In order to receive the burst in this case, the frequency deviation $\Delta f$ should be larger than 240 kHz.

The local wireless communication link 404 is encrypted in order to establish a secure wireless communication link that hinders third party interception of sensitive information.

It shall be mentioned that it is possible to insert at least one repeater (not shown in any Figure) that repeats the information transferred via the wireless communication link 404 between the first communication means 304 and the second communication means 401.

In an embodiment of the present invention the subscriber identity module 201*a* (see FIG. 3), comprised in the subscriber identity terminal 302, carries additional features which makes it possible to use the subscriber identity terminal as a credit card or a cash card. It is an advantage if the subscriber identity module 201*a* carries many features. The billing administration support system BASS (see FIG. 1) then supports billing administration. In this embodiment, it is an advantage of the present invention that the subscriber identity module 201*a* is separated from the wireless terminal 403, since it then for instance is possible to carry the subscriber identity module 201*a* comprised in the subscriber identity terminal 302 in a wallet.

Figure 5:
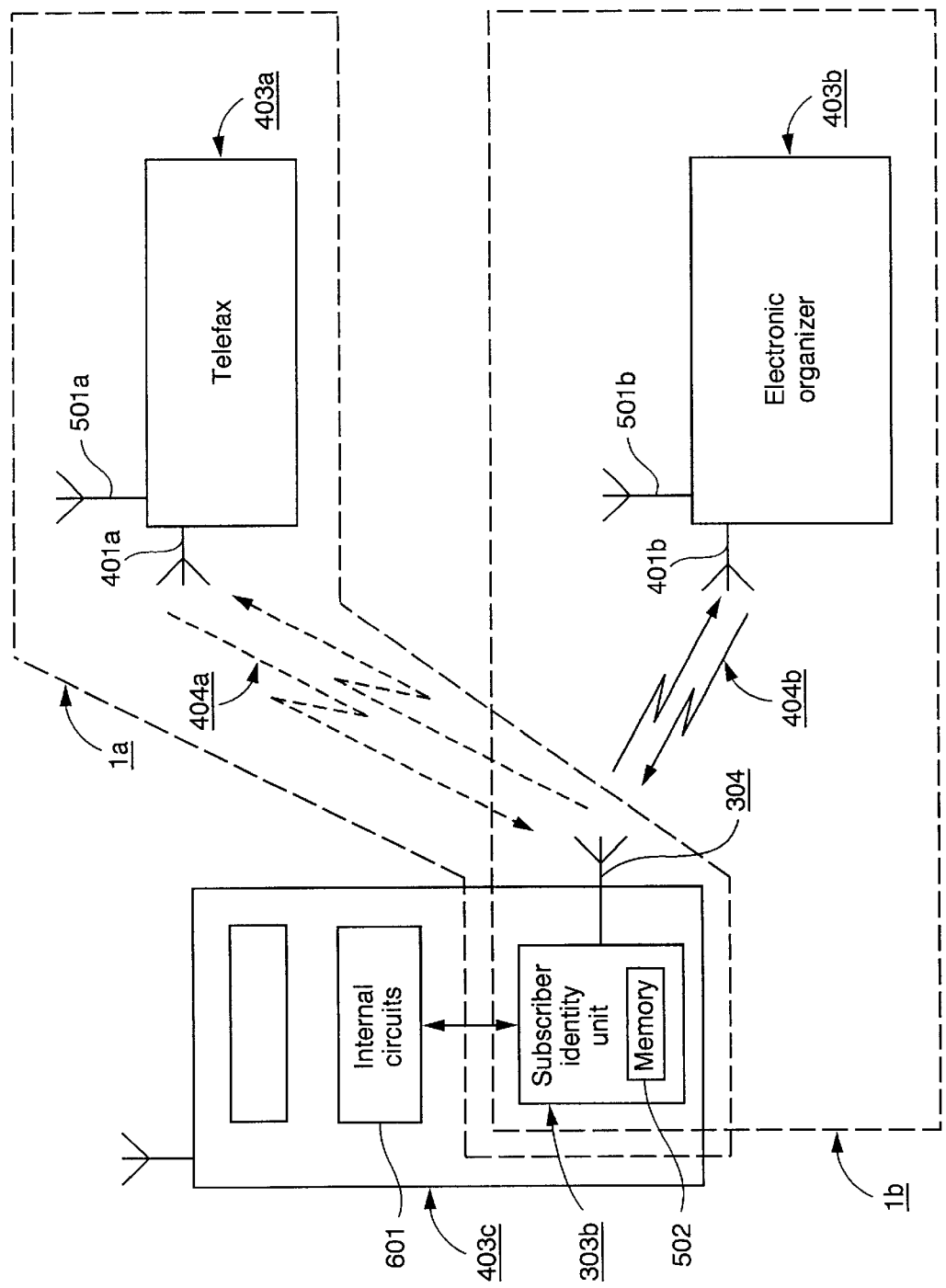
FIG. 5 illustrates in a block scheme two inventive arrangements with two wireless communication terminals and one wireless station comprising a subscriber identity unit.

FIG. 5 illustrates in a block scheme two inventive arrangements 1*a*; 1*b* with two wireless communication terminals 403*a*; 403*b* and a common subscriber identity unit 303*b* which are separated from each other.

The subscriber identity unit 303*b* is comprised in a station 403*c* which is a wireless communication terminal. As mentioned previously, the station is a device which comprises at least the subscriber identity unit. The subscriber identity unit 303*b* is connected to internal circuits 601 of the wireless terminal 403*c*. The internal circuits 601 include a controller.

The arrangement 1*a* comprises the subscriber identity unit 303*b* and the wireless communication terminal 403*a* which is a telefax. The wireless terminal 403*a* comprises both a transceiver 501*a* for communication in a wireless communication system such as GSM and also a second communication means which is a transceiver 401*a* for communication with the subscriber identity unit 303*b*.

The other arrangement 1*b* comprises the subscriber identity unit 303*b* and the wireless communication terminal 403*b* which is an electronic organizer. The wireless terminal 403*b* comprises both a transceiver 501*b* for communication in a wireless communication system such as GSM and also a transceiver 401*b* for communication with the subscriber identity unit 303*b*.

The subscriber identity module 201 (see FIG. 2) of the subscriber identity unit 303*b* can either function as a subscriber identity module to the wireless terminal 403*c* or as a subscriber identity module to one of the two arrangements 1*a*; 1*b*, wherein the subscriber identity unit 303*b* communicates over a local wireless link 404*a*; 404*b* with one of the two wireless terminals 403*a*; 403*b*. In an embodiment of the present invention one of the terminals 403*a*; 403*b* get under control of the subscriber identity unit 303*b* when one or both of the transceivers 401*a*; 401*b* detect the presence of the remote subscriber identity unit 303*b*. In a wireless communication system 101, this results in that all communication with a base transceiver station BTS1 over a communication channel uses either the transceiver 501*a* or the transceiver 501*b* (see FIG. 1). In another embodiment of the present invention wherein the wireless terminal 403*a* and the wireless terminal 403*b* are physically close to each other, for instance closer than 10 meters to each other, they can have a mutual precedence regarding which one of the terminals 403*a*; 403*b* that shall respond to an incoming call from a base station. However, both of the terminals 403*a*; 403*b* shall establish a communication over the local wireless link 404*a*; 404*b* with the subscriber identity unit 303*b*.

An incoming call from a base station to a wireless terminal 403*a*; 403*b* will be routed to the terminal 403*a*; 403*b* that get under control of the subscriber identity unit 303*b*.

In an embodiment of the present invention, the subscriber identity unit 303b comprises information in a memory 502 about which wireless communication terminals 403a; 403b that have the authority to communicate the subscriber identity module related data 901 (see FIG. 9) over the local wireless communication link 404a; 404b with the subscriber identity unit 303b. In a GSM network the International Mobile station Equipment Identity (IMEI) is used to uniquely identify the wireless terminals 403a; 403b. The subscriber identity unit 303b may also contain information about the mutual precedence regarding which one of the terminals 403a; 403b that shall respond to an incoming call from a base station. The mutual precedence may vary depending on which type of services that an incoming call from a base station to a wireless terminal 403a; 403b provides; for instance there may be a first mutual precedence for voice services, a second mutual precedence for data services such as short message services SMS and a third mutual precedence for telefax services. For instance an incoming telefax call may be answered automatically by the tele-fax 403a. The mutual precedence may either be determined automatically by the subscriber identity unit 303b or manually by a user. The mutual precedence may be determined manually by a user via a user interface (not shown in FIG. 5) of either the subscriber identity unit 303b or of one of the wireless terminals 403a; 403b; 403c. A subscriber identity of an incoming call may also determine the mutual precedence.

The mutual precedence regarding which one of the terminals 403a; 403b that shall send an outgoing call from the wireless terminal 403a; 403b to a base station may be determined in accordance with which one of the transceivers 401a; 401b that is first to establish communication over a local wireless link 404a; 404b with the subscriber identity unit 303b. Accordingly the mutual precedence regarding reading information from and/or writing information on the subscriber identity module 201 (see FIG. 2) may be determined in accordance with which one of the transceivers 401a; 401b that is first to establish communication over the local wireless link 404a; 404b with the subscriber identity unit 303b. Such information may for instance be information in the address-book or Short Message Services.

In an embodiment of the present invention both the terminals 403a; 403b communicate in the wireless communication system 101 simultaneously wherein both the terminals 403a; 403b establish communication over both the local wireless links 404a; 404b simultaneously. In this embodiment particular identity information attached to each terminal 403a; 403b, which is the International Mobile station Equipment Identity (IMEI) in a GSM network, is used to distinguish the terminals 403a; 403b from each other.

In a preferred embodiment of the present invention, the memory 502 is protected by means of the personal identification number PIN (see FIG. 2). If information stored in the memory 502 about a terminal is to be deleted or if information about yet another terminal (not in FIG. 5) beside the terminals 403a; 403b is to be added to the memory 502, the personal identification number PIN must first be entered for instance via a keypad.

Figure 6A:
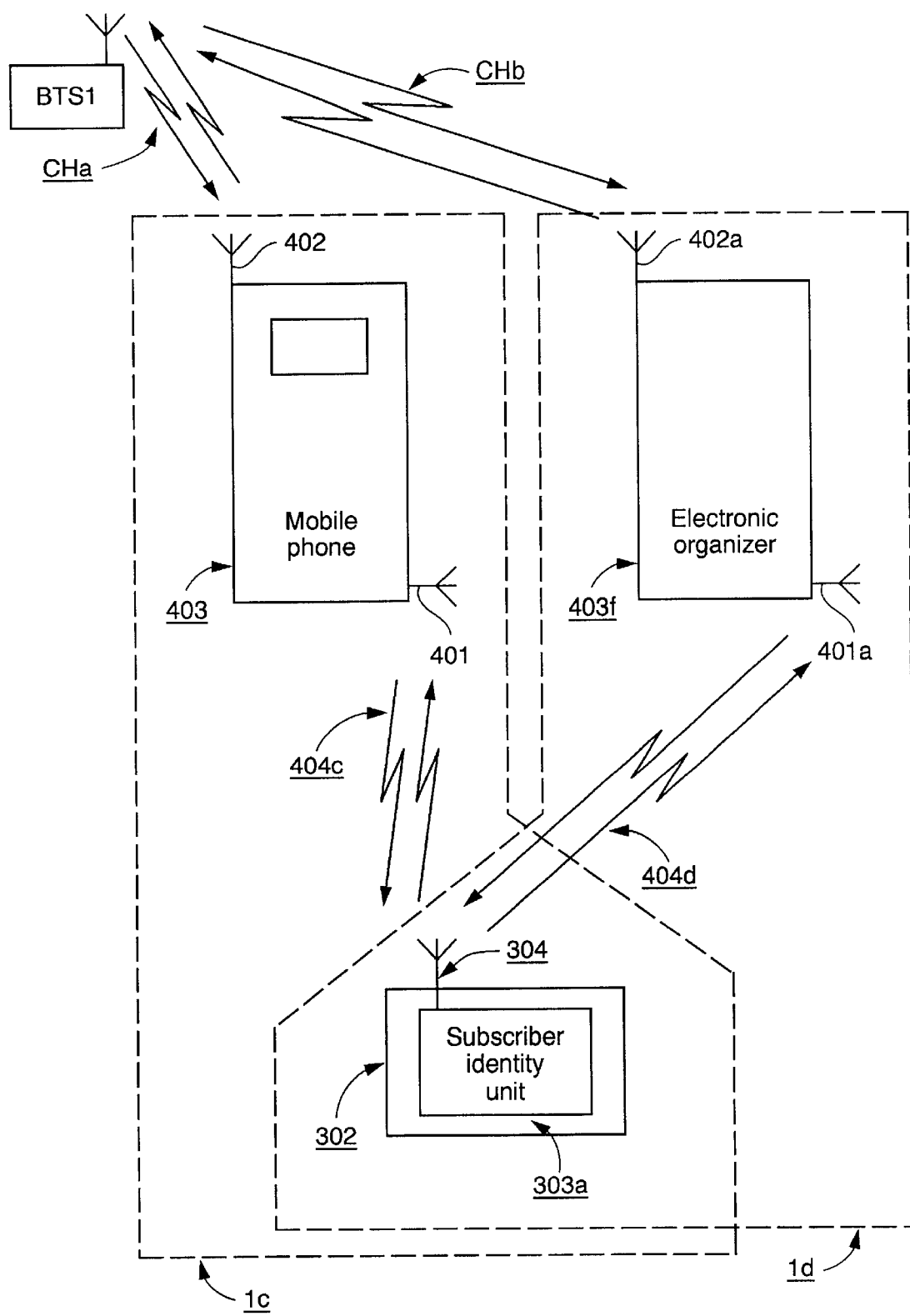
FIG. 6a illustrates in a block scheme a base station and two inventive arrangements with two wireless communication terminals and one subscriber identity unit.

FIG. 6a illustrates in a block scheme a base station BTS1 and two inventive arrangements 1c; 1d with two wireless communication terminals 403; 403f and one subscriber identity unit 303a.

The subscriber identity unit 303a is comprised in a station 302 which is a subscriber identity terminal 302. The subscriber identity terminal 302 comprises the first communication means 304 which is a transceiver.

The inventive arrangement 1c comprises the subscriber identity unit 303a and the wireless communication terminal 403 which is a mobile phone. The mobile phone comprises the second communication means 401 and the transceiver 402. The mobile phone communicates via the transceiver 402 over a communication channel CHa with the base transceiver station BTS1 of the wireless communication system 101 (see FIG. 1). The mobile phone communicates via the second communication means 401 over a local wireless communication link 404c with the first communication means 304.

The inventive arrangement 1d comprises the subscriber identity terminal 302 and the wireless communication terminal 403f which is an electronic organizer. The electronic organizer comprises the second communication means 401a and a transceiver 402a. The electronic organizer communicates via the transceiver 402a over a communication channel CHb with the base transceiver station BTS1 of the wireless communication system 101 (see FIG. 1). The electronic organizer communicates via the second communication means 401a over a local wireless communication link 404d with the first communication means 304.

It shall be mentioned that several wireless communication terminals (two terminals 403; 403f in FIG. 6) can communicate with one subscriber identity unit 303a. Also one and the same terminal can communicate with different subscriber identity units (not shown in any Figure). Hence, it is possible for several different subscribers of different subscriber identity units to communicate in a wireless communication system 101 (see FIG. 1) even if only one wireless terminal is used.

Figure 6B:
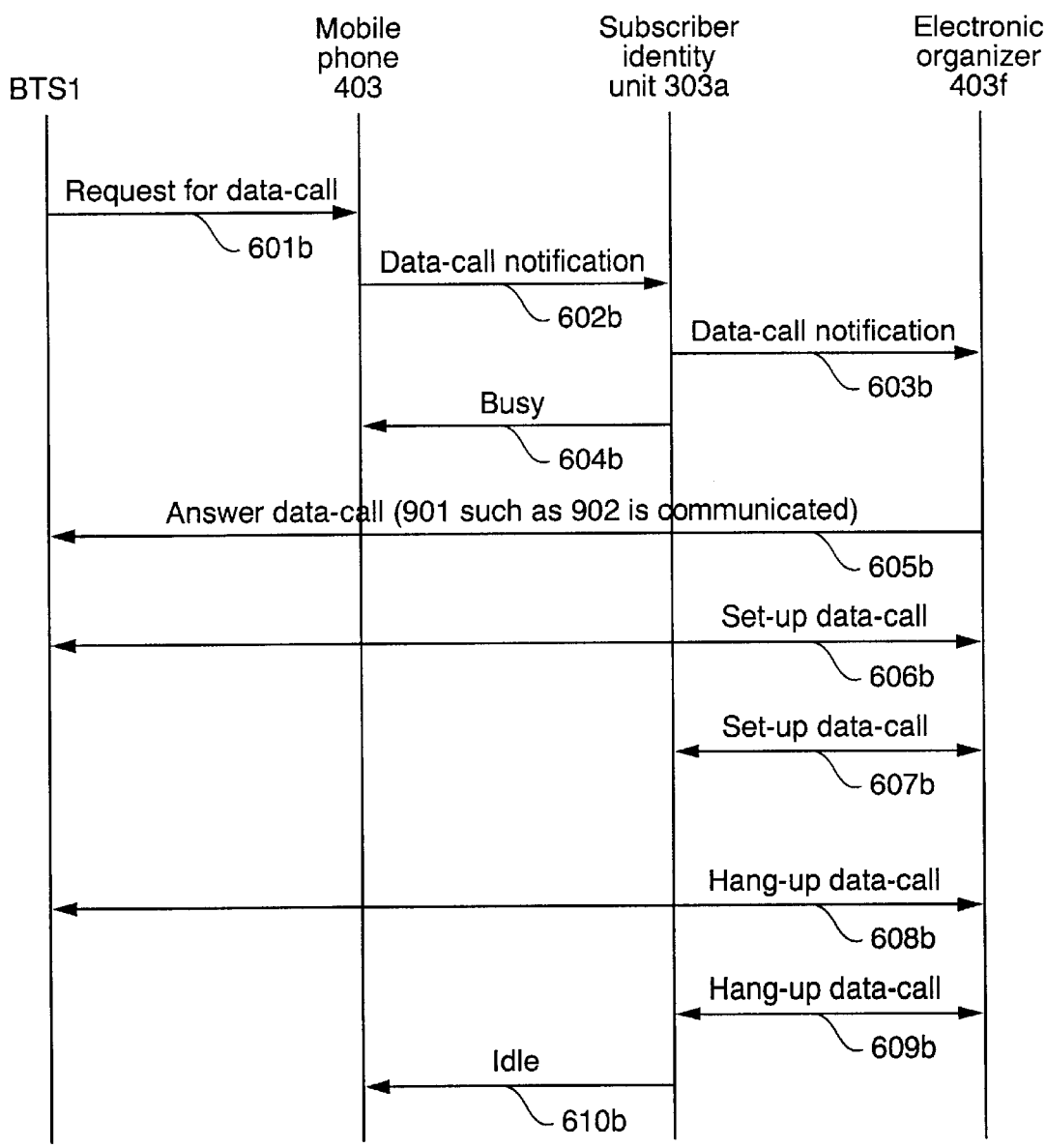
FIG. 6b illustrates in a diagram a signalling communication according to the present invention between a base station and two wireless communication terminals and between the two wireless communication terminals and one subscriber identity unit.

FIG. 6b illustrates in a diagram an inventive signalling communication between the base station BTS1 and the two wireless communication terminals 403; 403f and between the two wireless communication terminals 403; 403f and the subscriber identity unit 303a. The base station BTS1, the two wireless communication terminals 403; 403f and the subscriber identity unit 303a are illustrated in a block scheme in FIG. 6a. For voice-communication, the wireless terminal 403 which is a mobile phone is a master over the subscriber identity unit 303a and over the wireless terminal 403f which is an electronic organizer. Accordingly, for data- and telefax-communication, the electronic organizer 403f is a master over the subscriber identity unit 303a and over the wireless communication terminal 403 which is a mobile phone.

In the signalling communication diagram illustrated in FIG. 6b the local wireless link 404c (see FIG. 6a) between the mobile phone 403 and the subscriber identity unit 303a and also the local wireless link 404d between the electronic organizer 403f and the subscriber identity unit 303a are already established.

FIG. 6b illustrates a signalling communication for a data-call between the base station BTS1 and the electronic organizer 403f. In a first step 601b a request for a data-call from the base station BTS1 to the mobile phone 403 is made. In a next step 602b a data-call notification from the mobile phone 403 to the subscriber identity unit 303a is made. In a next step 603b a data-call notification from the subscriber identity unit 303a to the electronic organizer 403f is made. In a next step 604b the subscriber identity unit 303a is signalling to the mobile phone 403 that the subscriber identity unit 303a is busy. In a next step 605b the electronic organizer 403f answers the data-call from the base station BTS1. During the step 605*b* subscriber identity module related data 901 such as the subscriber identity 902 is communicated. In a signalling communication in a GSM network as in FIG. 6*b*, the subscriber identity 902 is the International Mobile Subscriber Identity (IMSI). In a next step 606*b* a data-call signalling communication is set-up between the electronic organizer 403*f* and the base station BTS1. In a next step 607*b* a data-call signalling communication is set-up between the electronic organizer 403*f* and the subscriber identity unit 303*a*. When the data call is to terminate, the data-call signalling communication between the electronic organizer 403*f* and the subscriber identity unit 303*a* is hang-up in a next step 608*b*. In a next step 609*b* the data-call signalling communication between the electronic organizer 403*f* and the subscriber identity unit 303*a* is hang-up. Finally, in a next step 610*b*, the subscriber identity unit 303*a* is signalling to the mobile phone 403 that the subscriber identity unit is idle.

Figure 7:
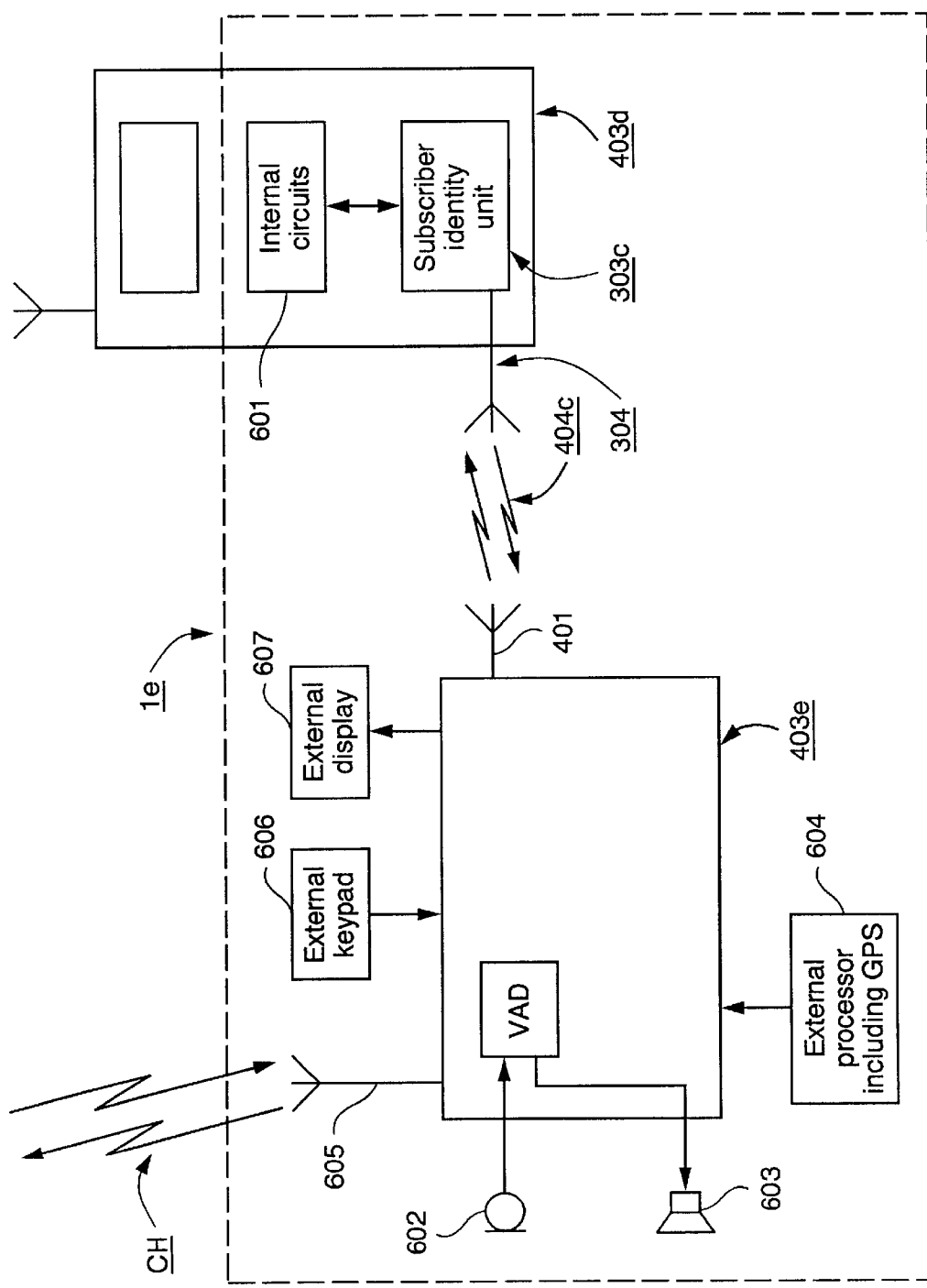
FIG. 7 illustrates in a block scheme an embodiment of an inventive arrangement with a wireless communication terminal and a wireless station comprising a subscriber identity unit.

FIG. 7 illustrates in a block scheme an inventive authentication arrangement 1*e* with a wireless communication terminal 403*e* and a subscriber identity unit 303*c* which are separated from each other.

The subscriber identity unit 303*c* is comprised in a station which is the wireless communication terminal 403*d*. As mentioned previously, the station is a device which comprises at least the subscriber identity unit. The subscriber identity unit 303*c* is connected to internal circuits 601 of the wireless terminal 403*d*. The internal circuits 601 include a controller.

The subscriber identity unit 303*c* comprises the first communication means 304 which is a transceiver. The transceiver 304 communicates over the local wireless link 404*c* with the transceiver 401 of the wireless terminal 403*e*. The wireless terminal 403*e* includes a voice activity detector VAD which is connected to an external microphone 602. Also an external speaker 603, an external processor 604, an external antenna 605, an external keypad 606 and an external display 607 are connected to the wireless terminal 403*e*. The external processor 604 includes a Ground Positioning System GPS which registers the position of the wireless communication terminal 403*e*.

The subscriber identity module 201*a* (see FIG. 3) of the subscriber identity unit 303*c* can either function as a subscriber identity module to the wireless terminal 403*d* or as a subscriber identity module of the authentication arrangement 1*e*. In an embodiment of the present invention the wireless terminal 403*e* get under control of the subscriber identity unit 303 when the transceiver 401 detects the presence of the remote subscriber identity unit 303*c*. In a GSM network, this results in that all communication with the base transceiver station BTS1 over a communication channel CH uses the antenna 605 (see FIG. 1).

The wireless communication terminal can for instance be installed in a car wherein the transceiver 401, the microphone 602, the speaker 603, the processor 604, the antenna 605, the keypad 606 and the display 607 are all equipment of the car. Dialling, answering and other operations can be made by either using the keypad 606 built into the car or by voice control using the microphone 602 built into the car. Alternatively, a keypad of the wireless terminal 403*d* can be used for dialling, answering and other operations. It is an advantage that an excellent hands-free environment is achieved in the car. It is a further advantage that no cables or electronics are necessary to use in order to connect the equipment of the car to the wireless terminal 403*e*, i.e. it is a further advantage that the wireless terminal 403*e* does not have to be physically connected to the equipment of the car.

Figure 8:
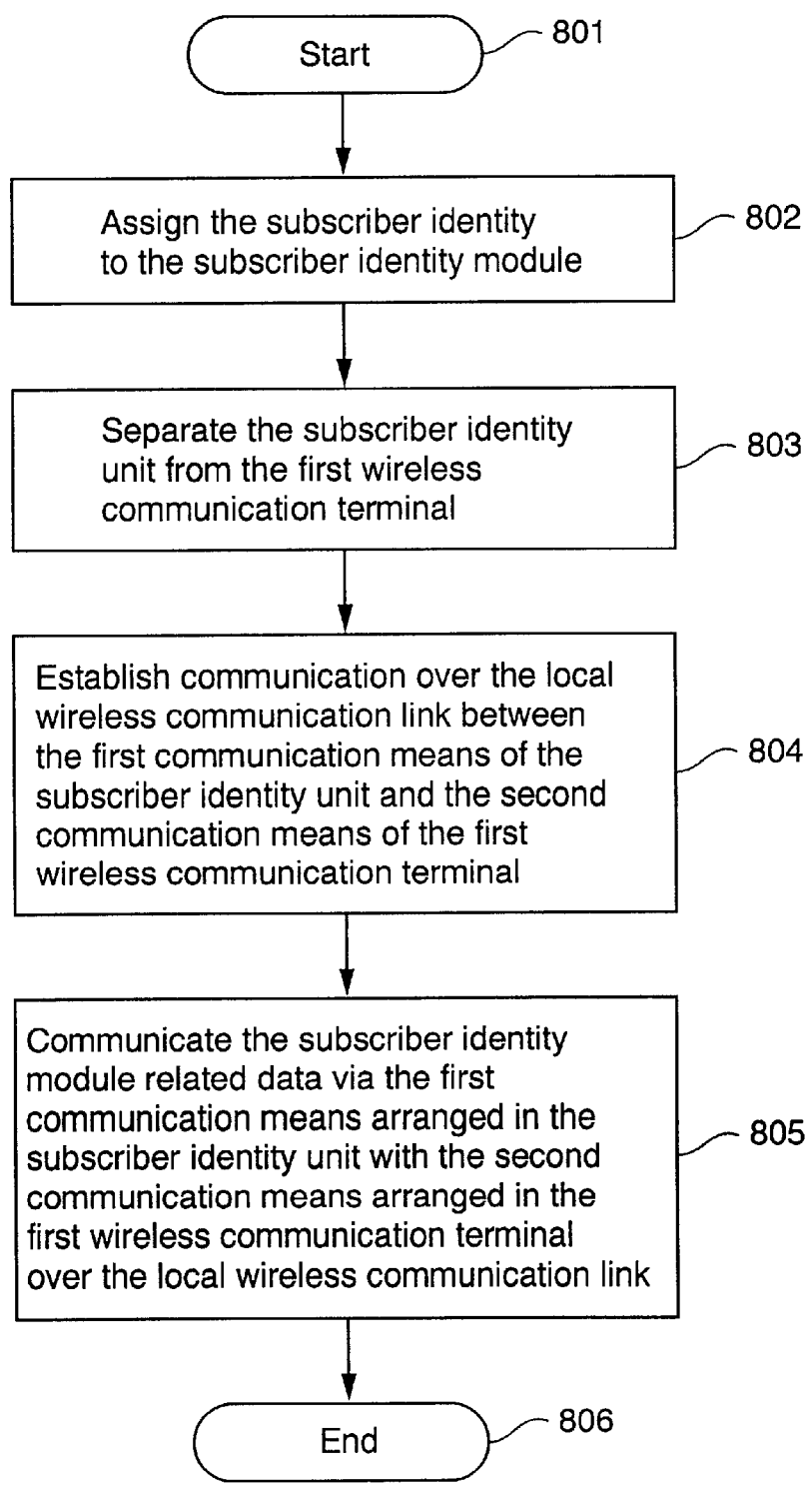
FIG. 8 illustrates in a flowchart a method according to the present invention for communication of subscriber identity module related data in a wireless communication system.

FIG. 8 illustrates in a flowchart a method according to the present invention for communication of subscriber identity module related data 901 (see FIG. 9) in a wireless communication system. The reference signs referred to in the following text are found in the previous Figures.

The method in FIG. 8 starts at a start position 801. In a next step 802 the subscriber identity 902 is assigned to the subscriber identity module 201. In a next step 803 the subscriber identity unit 303 is separated from the first wireless communication terminal 403. In a next step 804 communication is established over the local wireless communication link 404 between the first communication means 304 of the subscriber identity unit 303 and the second communication means 401 of the first wireless communication terminal 403. In a next step 805 subscriber identity module related data 901 is communicated via the first communication means 304 arranged in the subscriber identity unit 303 with the second communication means 401 arranged in the first wireless communication terminal 403 over the local wireless communication link 404. Finally, the method ends in an end position 806.

Figure 9:
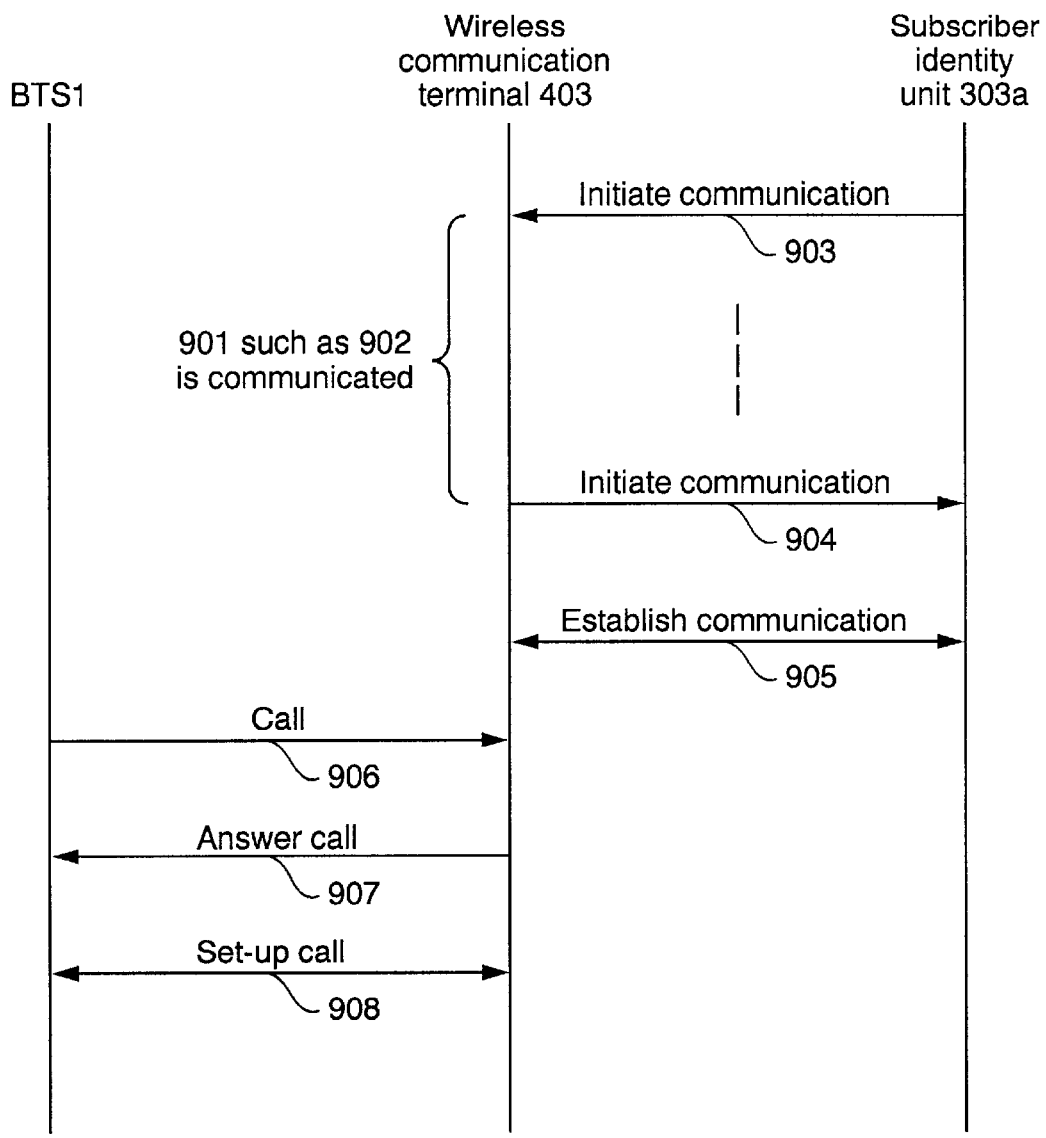
FIG. 9 illustrates in a diagram a signalling communication according to the present invention between a wireless communication terminal, a subscriber identity unit and a base station of a wireless communication system.

FIG. 9 illustrates in a diagram a signalling communication between the wireless communication terminal 403, the subscriber identity unit 303*a* and the base station BTS1 of the wireless communication system 101 which is a GSM network (see FIG. 1).

The base station BTS1, the wireless communication terminal 403 and the subscriber identity unit 303*a* are illustrated in a block scheme in FIG. 6*a*.

In a first step 903 and a second step 904 the subscriber identity unit 303*a* and the wireless terminal 403 are initiating communication with each other over the local wireless link 404 (see FIG. 4). Subscriber identity module related data 901 such as the subscriber identity 902 is communicated during the steps 903 and 904. Also, the wireless communication terminal 403 is given authentication to communicate in the wireless communication system 101 during the steps 903 and 904. Also, the wireless communication terminal 403 is assigned to be the default terminal for incoming calls from the base station BTS1, i.e. incoming calls from the base station BTS1 will be routed to the wireless communication terminal 403, during the steps 903 and 904. In a signalling communication in a GSM network as in FIG. 9, the subscriber identity 902 is the International Mobile Subscriber Identity (IMSI). In a next step 905 a communication is established via the local wireless link 404*c* (see FIG. 6*a*) between the subscriber identity unit 303*a* and the wireless terminal 403.

In a next step 906 a call is made from the base station BTS1 to the wireless communication terminal 403. In a next step 907 the wireless communication terminal 403 answers the call from the base station BTS1. Finally, in a next step 908, a call signalling communication is set-up between the base station BTS1 and the wireless communication terminal 403.

It shall be mentioned that the subscriber identity module (see FIG. 3) of the subscriber identity unit 303*a* contains different types of data; the subscriber identity 902, temporary network data and service related data. The subscriber identity 902 has been entered by the network operator and can not be changed by the user. Temporary network data, such as location information, is updated by the wireless terminal 403 with information sent by the network. Service related data, such as abbreviated dialling numbers, is handled by the user when access conditions are fulfilled.

What is claimed is:

1. An arrangement for communication of subscriber identity module related data in a wireless communication system, the arrangement comprising:

at least a first portable wireless communication terminal; and a subscriber identity unit including a subscriber identity module to which a subscriber identity is assigned, and wherein the subscriber identity unit is configured to communicate an authentication, including the subscriber identity module related data, from the subscriber identity unit to the first portable wireless communication terminal over a local wireless communication link, the first portable wireless communication terminal adapted to use the subscriber identity module related data to communicate in the wireless communication system.

2. An arrangement according to claim 1, wherein the subscriber identity module related data includes at least the subscriber identity, and wherein the first portable wireless communication terminal is given authentication in the wireless communication system.

3. An arrangement according to claim 1, wherein the subscriber identity unit can be separated from the first portable wireless communication terminal.

4. An arrangement according to claim 1, wherein the subscriber identity unit is part of a subscriber identity terminal.

5. An arrangement according to claim 1, wherein the subscriber identity unit is part of a second wireless communication terminal.

6. An arrangement according to claim 1, further comprising at least two wireless communication terminals, and wherein the subscriber identity module is further configured to communicate the subscriber identity module related data to each of the at least two wireless communication terminals at the same time or at different times, selectively.

7. An arrangement according to claim 1, wherein the local wireless communication link operates within a radio frequency range.

8. An arrangement according to claim 7, wherein the local wireless communication link operates within a frequency range of approximately 2.4 GHz.

9. An arrangement according to claim 1, wherein the local wireless communication link operates within an infrared frequency range.

10. A station for use in a wireless communication system, the station comprising:

a subscriber identity unit having a subscriber identity module to which a subscriber identity is assigned, and wherein the subscriber identity unit is configured to communicate an authentication, including the subscriber identity module related data, from the subscriber identity unit to a first portable wireless communication terminal over a local wireless communication link, wherein the subscriber identity module related data is adapted to be used by the first portable wireless communication terminal to communicate in the wireless communication system.

11. A station according to claim 10, wherein the subscriber identity module related data includes at least the subscriber identity.

12. A station according to claim 10, wherein the station is the subscriber identity unit.

13. A station according to claim 10, wherein the station is a subscriber identity terminal.

14. A station according to claim 10, wherein the station is a wireless communication terminal.

15. A station according to claim 10, wherein the local wireless communication link operates within a radio frequency range.

16. A station according to claim 15, wherein the local wireless communication link operates within the frequency range of approximately 2.4 GHz.

17. A station according to claim 10, wherein the local wireless communication link operates within an infrared frequency range.

18. A method for communication of subscriber identity module related data in a wireless communication system for at least a first portable wireless communication terminal using a subscriber identity unit having a subscriber identity module that is configured to communicate an authentication to the first portable wireless communication terminal, the method comprising the steps of:

assigning a subscriber identity to the subscriber identity module;

establishing communication over a local wireless communication link between the subscriber identity unit and the first portable wireless communication terminal;

communicating subscriber identity module related data over the local wireless communication link from the subscriber identity unit to the first portable wireless communication terminal; and establishing communication between the first portable wireless communication terminal and a wireless communication system using the subscriber identity module related data.

19. A method according to claim 18, wherein the subscriber identity module related data includes at least the subscriber identity, and the step of communicating the subscriber identity module related data further includes providing authentication to the first portable wireless communication terminal in the wireless communication system.

20. A method according to claim 18, further comprising separating the subscriber identity unit from the first portable wireless communication terminal.

21. A method according to claim 18, further comprising providing the subscriber identity unit in a subscriber identity terminal.

22. A method according to claim 18, further comprising providing the subscriber identity unit in a second wireless communication terminal.

23. A method according to claim 22, further comprising communicating the subscriber identity module related data with at least one of at least two wireless communication terminals at a time.

24. A method for communication of subscriber identity module related data in a wireless communication system for at least a first portable wireless communication terminal using a subscriber identity unit having a subscriber identity module that is configured to communicate an authentication to the first portable wireless communication terminal, the method comprising the steps of:

assigning a subscriber identity to the subscriber identity module;

establishing communication over a local wireless communication link between the subscriber identity unit and the first portable wireless communication terminal;

communicating subscriber identity module related data with at least one of at least two wireless communication terminals at a time over the local wireless communication link; and establishing communication between the first portable wireless communication terminal and a wireless communication system using the subscriber identity module related data; and routing an incoming call to the one of the wireless communication terminals under control of the subscriber identity unit.

25. A method according to claim 24, further comprising routing an outgoing call from the one of the wireless communication terminals under control of the subscriber identity unit.

26. A method according to claim 24, further comprising at least one step selected from the following two steps:

routing an incoming call to one of the wireless communication terminals in accordance with a mutual precedence between the wireless communication terminals; and routing an outgoing call from one of the wireless communication terminals in accordance with the mutual precedence between the wireless communication terminals.

27. A method according to claim 26, further comprising storing information in a memory of the subscriber identity unit about the mutual precedence.

28. A method according to claim 26, further comprising varying the mutual precedence depending on which type of services are provided.

29. A method according to claim 26, further comprising determining the mutual precedence automatically using the subscriber identity unit.

30. A method according to claim 26, further comprising determining the mutual precedence automatically using the subscriber identity the incoming call.

31. A method according to claim 26, further comprising determining the mutual precedence manually using the wireless communication terminals via a user interface of either the subscriber identity unit or of one of the wireless communication terminals.

32. A method according to claim 24, further comprising communicating the subscriber identity module related data over the local wireless communication link using radio frequency signals.

33. A method according to claim 32, further comprising communicating the subscriber identity over the local wireless communication link within the frequency range of approximately 2.4 GHz.

34. A method according to claim 24, further comprising communicating the subscriber identity over the local wireless communication link using infrared frequency signals.

35. An arrangement for communication of subscriber identity module related data in a wireless communication system, the arrangement comprising:

at least a first wireless communication terminal; and a subscriber identity unit including a subscriber identity module to which a subscriber identity is assigned, and wherein the subscriber identity unit is configured to communicate an authentication, including the subscriber identity module related data, from the subscriber identity unit to the first wireless communication terminal over a local wireless communication link established between the subscriber identity unit and the first wireless communication terminal, wherein the local wireless communication link is arranged to be established while the first wireless communication terminal is communicating in the wireless communication system.

36. A station for use in a wireless communication system, the station comprising:

a subscriber identity unit having, a subscriber identity module to which a subscriber identity is assigned, and wherein the subscriber identity unit is configured to communicate an authentication, including the subscriber identity module related data, from the subscriber identity unit to a first wireless communication terminal over a local wireless communication link, wherein the local wireless communication link is arranged to be established while the first wireless communication terminal is communicating in the wireless communication system.

37. A method for communication of subscriber identity module related data in a wireless communication system for at least a first wireless communication terminal using a subscriber identity unit having a subscriber identity module that is configured to communicate an authentication to the first wireless communication terminal, the method comprising the steps of:

assigning a subscriber identity to the subscriber identity module;

establishing communication over a local wireless communication link between the subscriber identity unit and the first wireless communication terminal; and communicating subscriber identity module related data over the local wireless communication link from the subscriber identity unit to the first wireless terminal, wherein the local wireless communication link is arranged to be established while the first wireless communication terminal is communicating in the wireless communication system.

* * * * *